May 17, 1960

G. E. GARD 2,937,229

ELECTRICAL COUPLING

Filed Sept. 10, 1957

INVENTOR
GEORGE E. GARD

ATTORNEY

United States Patent Office 2,937,229
Patented May 17, 1960

2,937,229

ELECTRICAL COUPLING

George E. Gard, East Hempfield Township, Lancaster County, Pa., assignor to Armstrong Cork Company, Lancaster, Pa., a corporation of Pennsylvania Application September 10, 1957, Serial No. 683,126

6 Claims. (Cl. 174—94)

This invention relates to an electrical coupling for use in high frequency, high energy level applications, such as dielectric heaters for industrial drying, baking, curing, and other services.

A typical high frequency, high energy level system may comprise an appropriate oscillator which generates high frequency energy, electrodes or other applicators adjacent to or between which the dielectric load to be heated is disposed for heating by the dielectric effect, and suitable conductors, generally of tubular form, constituting a transmission line connecting the oscillator to the electrodes, through suitable coupling reactances, etc.

In such systems it is desirable to provide demountable couplings at various points in the system so that portions of it may be electrically isolated for testing and checking and, when this has been accomplished, may be electrically connected again with a coupling which will properly conduct the high frequency, high energy level currents delivered to the system by the oscillator. For example, it may be desirable to provide a demountable coupling in the transmission line from the oscillator to the electrodes to make measurements of the dielectric load or to check the electrical characteristics of the applicator system. Another use for a demountable coupling would be to provide a convenient means for separating the oscillator from the load or transmission line to check the no load frequency, grid bias and power consumption of the oscillator, for instance. Demountable couplings would be useful at the joint between the transmission line and the coupling reactances, such as coupling coils or tuning stubs, to provide a convenient arrangement for measuring resistive and reactive values in the system with a Q-meter.

One of the major problems with demountable couplings, particularly where high frequency, high energy level applications are involved, is the provision of a low-resistance joint. The flow of high frequency electrical currents in the radio frequency range is essentially in the outer skin surface of the conductor. Thus, a mechanically formed joint must insure intimate contact between the conductors at the skin depth level of the current traveling along the outer surface of the conductor. Where the mechanical coupling of the parts does not provide an adequate electrical connection for such services, the electrical resistance at the joint causes a substantial temperature rise; and, of course, such resistance results in an appreciable power loss. Oxidation, scale, and general deterioration at the mechanical joint follow, and finally the coupling may burn out.

It is an object of the invention, therefore, to provide a novel, low-resistance, high current-carrying capacity coupling for high frequency services.

Another object of the invention is to provide a novel coupling through which high frequency, high energy level currents may be fed which, when disconnected, will provide electrical isolation of the coupled conductors.

Another object of the invention is to provide a novel demountable coupling construction in which the pressure applied to the coupling parts per unit area at the coupling joints is high to provide for good conduction of the high frequency electrical currents through the skin surfaces of the coupling.

A further object of the invention is to provide a novel coupling which may be demounted and reassembled readily and repeatedly without sacrifice in current-carrying capacity and without increase in the electrical resistance at the joints of the coupling.

In order that the invention may be readily understood, an embodiment of the invention will be described in conjunction with the attached drawing, in which.

Figure 1:
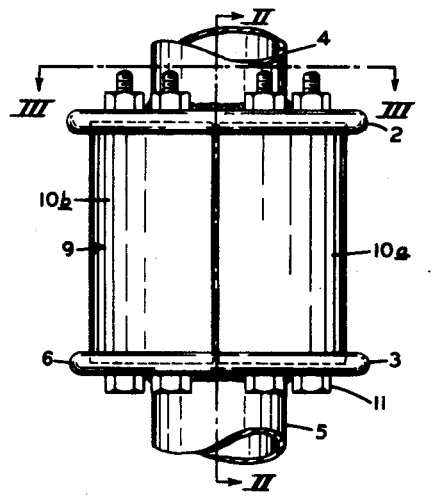
Figure 1 is a side view of a coupling unit embodying the invention.
Figure 2:
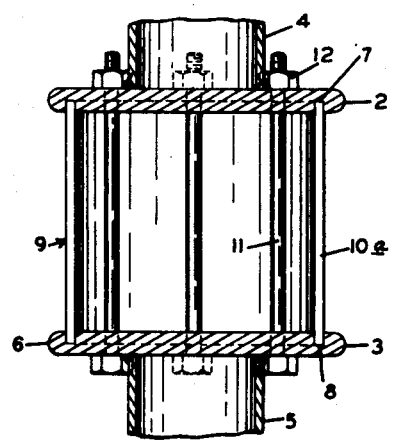
Figure 2 is a sectional view taken along the line II—II of Figure 1.
Figure 3:
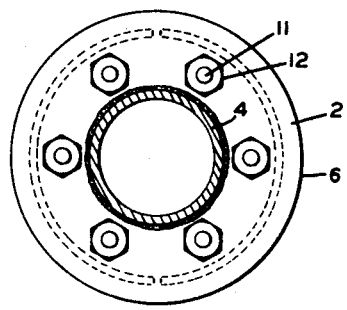
Figure 3 is a sectional view taken along the line III—III of Figure 1.

The coupling shown in the drawing includes a pair of compression plates 2 and 3. These preferably are made of hard copper and are silver-soldered to tubular conductors 4 and 5 which are to be coupled. The conductors preferably are disposed in the center of the plates 2 and 3. The plates 2 and 3 are circular in plan in the embodiment shown in the drawing, but they may be of other configurations, such as square, rectangular, etc. The peripheral edges 6 of the plates 2 and 3 preferably are rounded, as shown, to minimize voltage concentration and attendant electrical discharge. If square, rectangular, or other noncircular configurations are used, it will be desirable to round off the corners for the same reasons.

The compression plates 2 and 3 are each provided with an annular recess, numbered 7 in plate 2 and numbered 8 in plate 3. These recesses may be turned as grooves in the plates, as shown in the drawing, or they may be each in the form of a flange extending to the periphery of the plate from which it is formed.

A coupling conductor sleeve 9 is disposed between plates 2 and 3. In the embodiment shown in the drawing, the sleeve is made up of two half sections 10a and 10b which are shaped to fit within the recesses 7 and 8. While two hollow, semicylindrical coupling conductor half sections have been illustrated, because they may be readily formed from copper tubing of the desired size and because they provide for convenient assembly and demounting of the coupling, a greater number may be provided, or a single hollow sleeve may be employed.

The compression plates 2 and 3 are dimensioned with regard to the conductors 4 and 5 to provide space within the confines of the coupling conductor sleeve 9 for the passage of compression bolts 11 or other similar fastenings disposed between the plates 2 and 3. In the embodiment illustrated, there are six such bolts 11 equally spaced within the area bounded by the coupling conductor sleeve 9. These bolts 11 may be formed of heat treated alloy steel and may be provided with fastening nuts 12 of similar material. This permits the coupling conductor sleeve 9 to be drawn into extremely close engagement with the compression plates 2 and 3 with a high component of force developed per unit of contact area between the conductor sleeve 9 and the plates 2 and 3. By providing the fastenings 11 inside of the coupling conductor sleeve 9, they may be made of steel instead of copper or other more conductive material than ferrous metals. As mentioned previously, in high frequency current conductors, the current travels along the outer skin surface of the conductor; and, thus, fastenings disposed within the conductor will carry very little or no current.

The compression plates 2 and 3 are made large enough to receive the fastenings 11—12 and also to provide for insertion therebetween of a conductor sleeve, such as the conductor sleeve 9 shown in the drawing, having a surface area per unit of length which is greater than the surface area per unit of length of either of the conductors to be coupled, such as the hollow conductors 4 and 5 shown in the drawing. Thus, the nominal current-carrying capacity of the coupling sleeve will be greater than that of the conductors; and even though the current density applied to the system may be near the maximum current capacity of the conductors 4 and 5, the coupling will not be overloaded, notwithstanding that joint resistances of a minor magnitude may be encountered.

Such resistances are reduced to a minimum in the present coupling because of the high force per unit area which is applied to the relatively thin edge of the coupling sleeve by the coupling plates; and since the high frequency current is conducted in the skin surface of the sleeve, a substantially resistance-free coupling is achieved by thrusting the terminal ends of the sleeve into the compression plates and maintaining them in such position by the fastenings 11—12.

The joints in the coupling will not heat objectionably even when conducting high frequency currents at very high energy levels, and the problem of coupling deterioration is reduced to one of negligible significance.

The dimensions of the various components of the coupling may be varied and will depend upon the size of the conductors to be coupled, the frequency of the current impressed upon the system, the current density, and other variable factors. In a typical unit, the plates 2 and 3 are about twice the diameter of the conductors 4 and 5, as shown; and the coupling sleeve 9 is of slightly less diameter, being received within the recesses 7 and 8 provided in the plates 2 and 3 close to their outer peripheries. The diameter of the plates preferably is at least about twice the diameter of the conductors. The coupling sleeve 9 should be of sufficient thickness to withstand the compressive forces applied thereto by the bolts 11 and should be made of material which will properly conduct high frequency current, such as hard copper tubing. The area of contact between the ends of the coupling sleeve and the compression plates should be kept as low as practicable to insure the maximum force per unit of contact area between the parts, especially at the skin depth level of the current traveling along the surface of the coupling sleeve and compression plates. Such extremely high contact pressure per unit of area reduces the joint resistance, and heating is minimized.

The axial length of the coupling sleeve may be determined by the separation between plates 2 and 3 needed for circuit isolation when the coupling is demounted.

In a typical coupling for use in a high frequency system operating in the 10–30 megacycle range, with a current density of 150 amperes at the output of the oscillator to the transmission line, the conductors 4 and 5 may be 1½″ in outside diameter and made of hard copper tubing. The compression plates may be about 3¼″ in diameter and about ¼″ thick and made of hard copper. The coupling sleeve 9 may be formed of 3″ inside diameter copper tubing split into two half sections and may have a wall thickness of ⅛″ and 3″ length. The axial length of the coupling sleeve preferably is at least about equal to the diameter of the compression plates.

The coupling may be readily demounted by removal of the bolts 11 and "snapping out" of the two semi-cylindrical sections 10a and 10b of the coupling conductor sleeve 9 from within the recesses 7 and 8 in the plates 2 and 3. There is usually sufficient flexibility in the transmission line to permit the necessary small axial movement of separation of the sections 4 and 5 and the plates 2 and 3 connected thereto to permit the coupling sections 10a and 10b to be removed from within the grooves 7 and 8. If, however, the system is not adequately flexible for this purpose, the plates 2 and 3 may be provided with the flanges previously mentioned which extend to the outer periphery of the plates 2 and 3 so that, upon removal of the bolts 11, the coupling half sections 10a and 10b may be extracted in a generally radial direction.

When the coupling members 9 and 10 are removed, adequate circuit isolation preferably should be provided without the necessity for further separation of the conductors 4 and 5. This isolation is accomplished practically by the high impedance between the plates 2 and 3. As mentioned above, the axial length of the semicylindrical conductor sections 10a and 10b will be determined by this factor and preferably will be of such length that when they are removed, the desired high impedance between plates 2 and 3, relative to impedance to be isolated for measurement, will be obtained.

In reassembly of the coupling, the coupling conductor sections 10a and 10b are inserted in the grooves 7 and 8, the bolts 11 are reinserted, and the nuts 12 are drawn down to place the coupling sleeve 9 in compression between the plates 2 and 3, and a low-resistance joint is formed again.

I claim:

1. A low resistance, high current-carrying capacity electrical coupling for high frequency services comprising a pair of conductors of high frequency electrical current, a pair of spaced, aligned high frequency current-conducting compression plates electrically bonded at their respective outer boundary skin surfaces one to each of said conductors and in which said conductors respectively electrically terminate, and demountable means for providing high frequency current conduction between said plates and circuit isolation between said plates when said demountable means are removed and comprising a high frequency current-conducting coupling sleeve disposed on edge between said compression plates and in high frequency current-conducting relationship therewith and defining an outer boundary skin surface for conducting high frequency current, said sleeve having a high frequency current-conducting surface area per unit of length which is substantially greater than the high frequency current-conducting surface area per unit of length of either of said conductors, and removable clamping means spaced from said sleeve and each passing between and engaging both of said compression plates for placing said coupling conductor sleeve in compression between said compression plates to provide a low-resistance path for high frequency current from conductor to conductor along the outer boundary skin surfaces of said compression plates and said conductor sleeve.

2. An electrical coupling in accordance with claim 1 in which said compression plates each has a recess into which an edge of said conductor sleeve is received.

3. An electrical coupling in accordance with claim 2 in which said compression plates are of a diameter greater than said conductors and said clamping means pass between said compression plates within the confines of the conductor sleeve.

4. An electrical coupling in accordance with claim 1 in which the conductor sleeve is made up of a plurality of arcuate plate members.

5. An electrical coupling in accordance with claim 1 in which said compression plates are disk shaped and of a diameter at least about twice the diameter of said conductors, in which said sleeve is substantially in the form of a hollow cylinder, and in which said clamping means pass between said compression plates within the confines of the conductor sleeve.

6. An electrical coupling in accordance with claim 1 in which the length of said sleeve is at least about equal to the diameter of said compression plates.

References Cited in the file of this patent

UNITED STATES PATENTS

| | | |
|---|---|---|
| 651,143 | Kurtz | Jan. 5, 1900 |
| 776,310 | Finley | Nov. 29, 1904 |
| 783,944 | Frost | Feb. 28, 1905 |
| 1,035,499 | Travers et al. | Aug. 13, 1912 |
| 1,900,561 | Junggren | Mar. 7, 1933 |
| 2,197,450 | Curtis | Apr. 16, 1940 |

FOREIGN PATENTS

| | | |
|---|---|---|
| 676,872 | Germany | June 14, 1939 |